United States Patent [19]

Young

[11] Patent Number: 5,241,308
[45] Date of Patent: Aug. 31, 1993

[54] FORCE SENSITIVE TOUCH PANEL

[75] Inventor: Thomas Young, Oakland, Calif.

[73] Assignee: Paragon Systems, Inc., Oakland, Calif.

[21] Appl. No.: 918,917

[22] Filed: Jul. 23, 1992

Related U.S. Application Data

[63] Continuation of Ser. No. 484,123, Feb. 22, 1990, abandoned.

[51] Int. Cl.$^5$ .............................................. G08C 21/00
[52] U.S. Cl. ........................................ 341/34; 341/22
[58] Field of Search ................... 341/22, 34; 178/18; 340/706, 712, 718; 364/556, 558

[56] References Cited

U.S. PATENT DOCUMENTS

| | | | |
|---|---|---|---|
| 3,657,475 | 4/1972 | Peronneau et al. | 178/18 |
| 4,121,049 | 10/1978 | Roeber | 178/18 |
| 4,340,777 | 7/1982 | DeCosta et al. | 178/18 |
| 4,355,202 | 10/1982 | DeCosta et al. | 178/18 |
| 4,389,711 | 6/1983 | Hotta et al. | 178/18 |
| 4,442,317 | 4/1984 | Jandrell | 178/18 |
| 4,511,760 | 4/1985 | Garwin et al. | 178/18 |
| 4,550,384 | 10/1985 | Kimura | 178/18 |
| 4,558,757 | 12/1985 | Mori et al. | 178/18 |
| 4,644,326 | 2/1987 | Villalobos et al. | 341/34 |
| 4,675,569 | 6/1987 | Bowman et al. | 178/18 |
| 4,689,614 | 8/1987 | Strachan | 340/706 |
| 4,697,049 | 9/1987 | Peemoller et al. | 178/18 |
| 4,745,565 | 5/1988 | Garwin et al. | 178/18 |
| 4,771,277 | 9/1988 | Barbee et al. | 340/712 |
| 4,775,765 | 10/1988 | Kimura et al. | 178/18 |
| 4,814,760 | 3/1989 | Johnson et al. | 340/784 |

FOREIGN PATENT DOCUMENTS

| | | | |
|---|---|---|---|
| 58-72277 | 4/1983 | Japan | 341/34 |
| 1528581 | 10/1978 | United Kingdom . | |

OTHER PUBLICATIONS

"Force Sensing Mouse Pad", IBM Technical Disclosure Bulletin, Dec. 1991, vol. 34, No. 7A, pp. 224–226.
Mark Denney, Science, vol. 208, pp. 1288–1290, Jun. 13, 1980.
Logan, "Touch screens diverify" 7 un-numbered pages, reprint from Electronic Products Nov. 1, 1985.
Platshon, "Acoustic touch technology...", 6 un-numbered pages, reprint from Computer Design Mar. 15, 1988.

*Primary Examiner*—Donald J. Yusko
*Assistant Examiner*—John Edward Giust
*Attorney, Agent, or Firm*—Phillips, Moore, Lempio & Finley

[57] ABSTRACT

A touch panel generates any of a plurality of different signals that are selected by touching different specific areas of a panel member. Spaced apart supports at the edges of the touch sensitive area hold a panel member in spaced apart relationship to the underlying surface. Force sensitive circuit elements, such as strain gauges or pressure sensitive resistors, sense the force which the panel member exerts on each support when finger pressure is applied to the member. Additional circuit components compare the forces exerted on each support to determine the location on the panel that is being touched and generate the particular signal that correlates with that location. The touch panel may be used to enter instructions and other data into a computer or the like or to transmit selected control signals to other types of equipment. The panel may be transparent and be attached to the screen of a visual data display enabling entry of menu selections or other data by simply touching the screen.

23 Claims, 6 Drawing Sheets

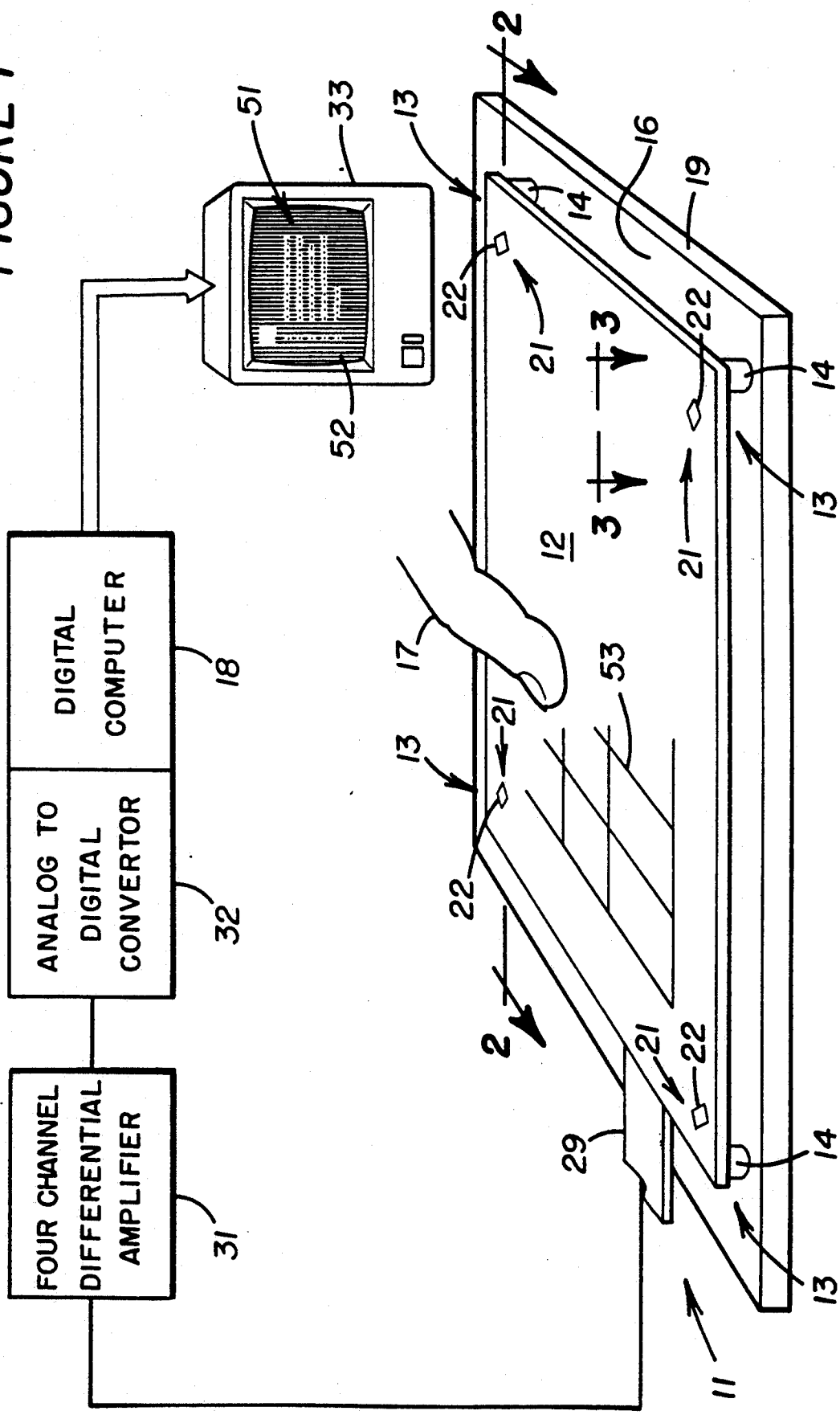

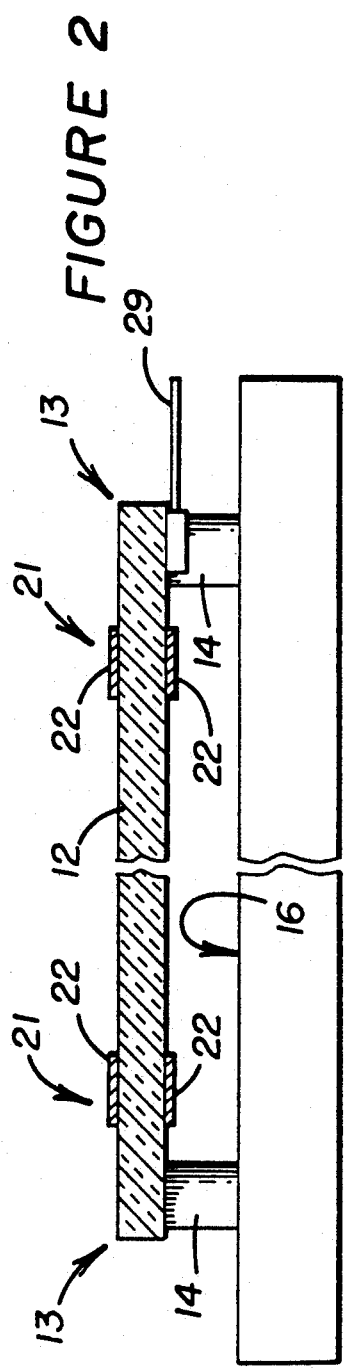
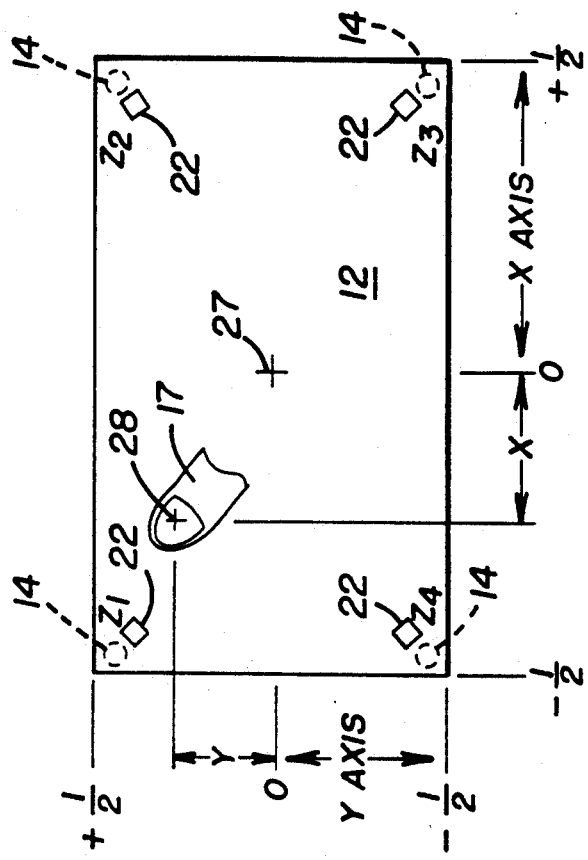
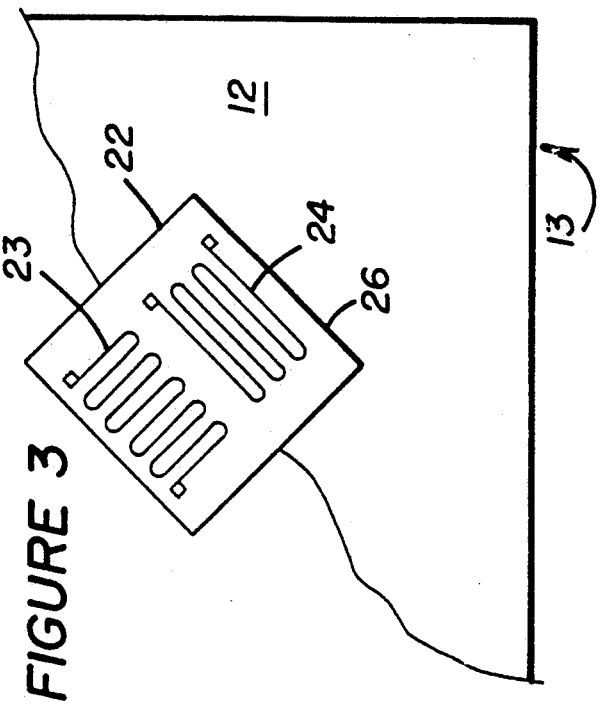

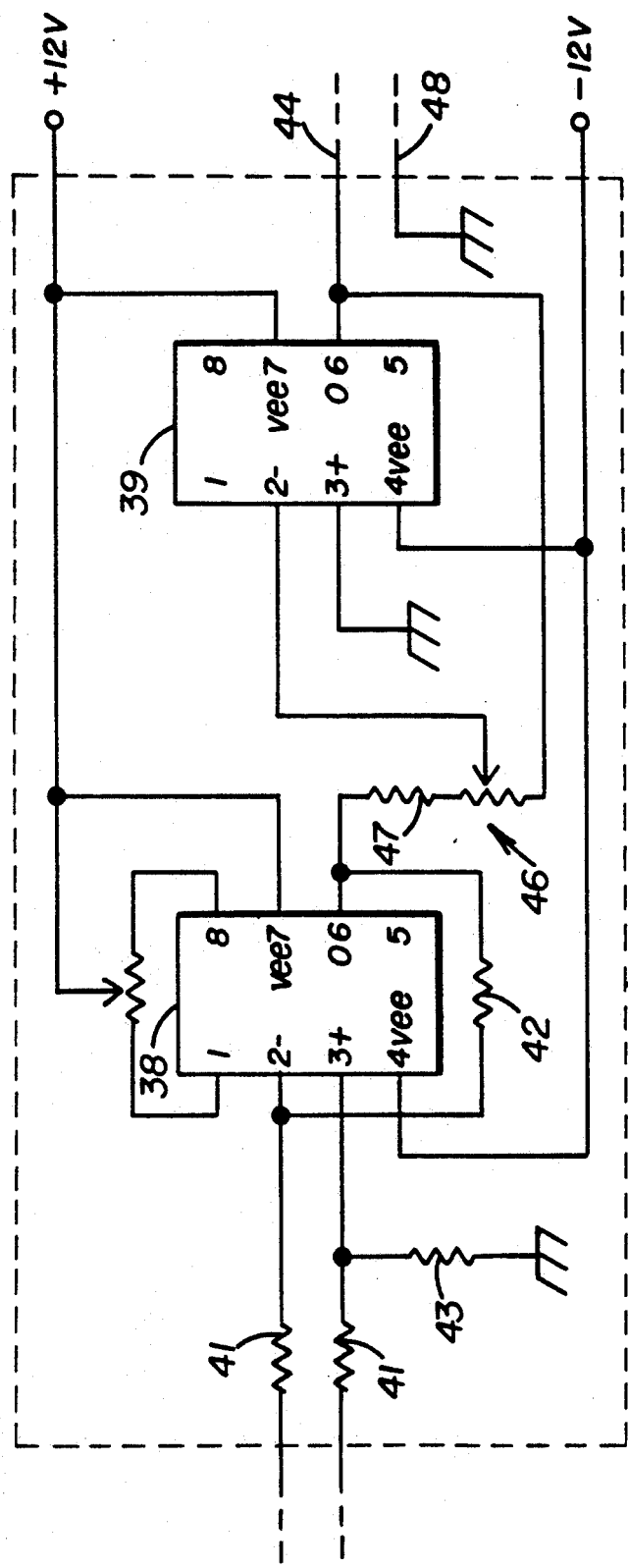
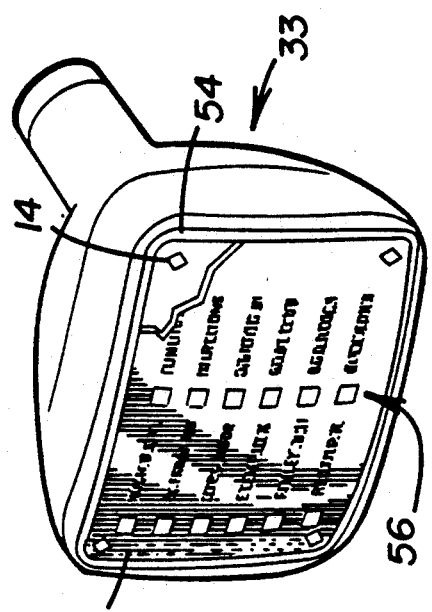
FIGURE 6
FIGURE 7

FORCE SENSITIVE TOUCH PANEL

This is a continuation of copending application of Ser. No. 07/484,123 filed on Feb. 22, 1990 now abandoned.

TECHNICAL FIELD

This invention relates to data input devices and more particularly to touch panels, touch pads, touch screens and the like which generate different signals when different specific areas of a panel are touched.

BACKGROUND OF THE INVENTION

Electromechanical keyboards, keypads or banks of switches or the like have traditionally been used to enable an operator to input control signals and other data to apparatus of various kinds. Such devices are mechanically complicated, bulky, easily damaged and wear rapidly. The more recently introduced touch panels or touch screens tend to be less subject to these problems and are rapidly replacing the electromechanical forms of data entry device.

Touch panels have a panel member, means for sensing touching of the panel by a human finger or a hand held tool of any of various kinds and means for generating electrical signals in response to touching of the panel. Touching of different specific areas of the panel produces different predetermined signals thereby enabling operator selection of desired control signals and operator transmssion of desired data to the apparatus that is coupled to the touch panel. The different areas of the panel that are touched to input, different control signals or different alphanumeric characters can be marked on the panel and thus the operator may use the panel in much the same manner as one operates an electromechanical keyboard or keypad.

Touch panels can be used to input instructions or other data into diverse types of apparatus of varying degrees of complexity, computers, industrial process control systems, automatic teller machines at banks and home appliances being examples. In the case of computers and similar devices that are connected to a cathode ray tube, liquid crystal display or other visual data display, the touch panel may be transparent and be affixed to the screen of the display. Such touch panels, termed touch screens, enable the operator to select menu items or enter other data by simply touching the appropriate area of the display screen thereby eliminating the need for a separate keyboard or keypad.

Prior touch panels sense touching of the panel member and the specific location of the touch by any of several techniques. These include detection of a change of capacitance at the touched area, detecting interruption of infrared beams which scan along the panel, sensing changes in voltage drop across resistive screens or orthogonal grids that are brought into contact by pressure on the panel and detecting changes in an acoustic wave pattern caused by a finger or other object in the vicinity of the screen.

Ideally, a touch panel should have a simple and inexpensive construction, offer high resolution with respect to distinguishing between touches at closely spaced points, be durable and wear resistant and be insensitive to temperature fluctuation and humidity. In the case of touch screens, the panel should also be highly transparent. Each of the prior types of touch panel lacks at least some of these attributes and selection of a touch panel for a particular usage has involved trade-offs between desirable properties.

In general, prior touch panels and screens are undesirably limited with respect to the amount of data that can be entered with a single touch. The information that is communicated by one touch of the panel is confined to the fact that an entry is being made and data indicative of the location at which the panel is being touched. Operations would be simplified if additional information could be communicated by the same touch.

The present invention is directed to overcoming one or more of the problems discussed above.

SUMMARY OF THE INVENTION

In one aspect of the present invention, a touch sensitive panel for generating selected ones of any of a plurality of different signals, each of which is generated by touching a different location on the panel, includes a panel member and a plurality of panel member supports situated at spaced apart regions of the member. Force sensing means sense the magnitudes of the forces that are applied to each support by the panel member when the member is touched at a selected location. The apparatus further includes location analyzing means for sensing the location on the panel member that is being touched by comparing the magnitudes of the forces that are applied to the supports by the panel member and for generating the one of the signals that corresponds to the sensed location.

In another aspect of the invention, the location analyzing means produces signals which have a first signal component indicative of the location at which the panel member is touched and a second signal component indicative of the pressure which is being exerted against the panel member at that location.

In another aspect of the invention, the force sensing means includes strain gauges secured to the panel member in the vicinity of the supports.

In another aspect of the invention, the force sensing means include electrical resistors of the type which exhibit a change of resistance when pressure is exerted against the resistor, the resistors being disposed between the panel member and the panel member supports.

In still another aspect, the invention provides a touch panel for generating selected ones of a plurality of different signals wherein each of the signals is correlated with a different location on the touch panel and includes a panel member having a touch sensitive area bounded by first and second sides and first and second ends. A plurality of panel member supports support the panel member at spaced apart regions which are situated at the sides and ends of the touch sensitive area. The apparatus further includes a plurality of force sensing electrical circuit components of the type in which electrical resistance varies in response to forces sensed by the components, each such component being secured to the panel member in position to sense the force which the panel member exerts on an associated one of the supports. Means are provided for producing a plurality of electrical voltages each of which varies in response to changes of the resistance of a separate one of the force sensing components. Data processing means determine the location on the panel member against which pressure is exerted by comparing the forces which are sensed by the force sensing components and produce the one of the signals that correlates with that location.

In a further aspect of the invention, the data processing means includes a digital computer coupled to a visual data display device which has a screen on which data generated by the computer may be displayed. The panel member is transparent and is positioned in front of the screen in spaced apart relationship with the screen. The panel member supports extend between the panel member and the data display device.

The invention differs from prior touch panels and the like in that the panel member need not have internal or external layers of different specialized materials nor grids of conductors or complex scanning systems in order to detect the area of contact of a finger or the like with the panel. The contact location is obtained indirectly by sensing the forces which the touched panel member applies to the several supports around its periphery with strain gauges, pressure sensitive resistors or the like and calculating the location of the touch from the relative magnitudes of such forces. Consequently, the panel member can be a simple plate of any of a variety of materials and the touch panel as a whole may have a very inexpensive construction. The panel does not necessarily require strong finger pressure and can provide high resolution with respect to distinguishing between touches at closely adjacent points. The panel may be formed of hard, durable, wear resistant material as it is not necessary that the panel material have specialized electrical properties. The signals that are produced are indicative not only of the location at which the panel is being touched but can also represent the total force that is being applied. This enables an operator to convey additional data to a computer or other apparatus with a single touch, in applications where that capability can be useful, by varying the amount of finger pressure which is applied to the panel.

The invention, together with further aspects and advantages thereof, may be further understood by reference to The following description of preferred embodiments and by reference to the accompanying drawings.

BRIEF DESCRIPTION OF THE DRAWINGS

FIG. 1 is in part a perspective view of a touch panel embodying the invention and in part a block diagram of certain electrical components of the apparatus.

FIG. 2 is a foreshortened cross section view of a portion of the touch panel of FIG. 1 taken along line 2—2 thereof.

FIG. 3 is an enlarged plan view of a corner region of a portion of the touch panel of FIG. 1 taken along line 3—3 thereof.

FIG. 4 is a diagram which facilitates an understanding of the mathematical operations involved in determining the specific location on the touch panel at which pressure is being exerted.

FIG. 6 is a diagram illustrating a suitable internal circuit for a differential amplifier that is shown in block form in FIG. 5.

FIG. 7 is a perspective view of a cathode ray tube visual data display device having a screen which embodies the invention.

DETAILED DESCRIPTION OF THE PREFERRED EMBODIMENTS

Figure 5:
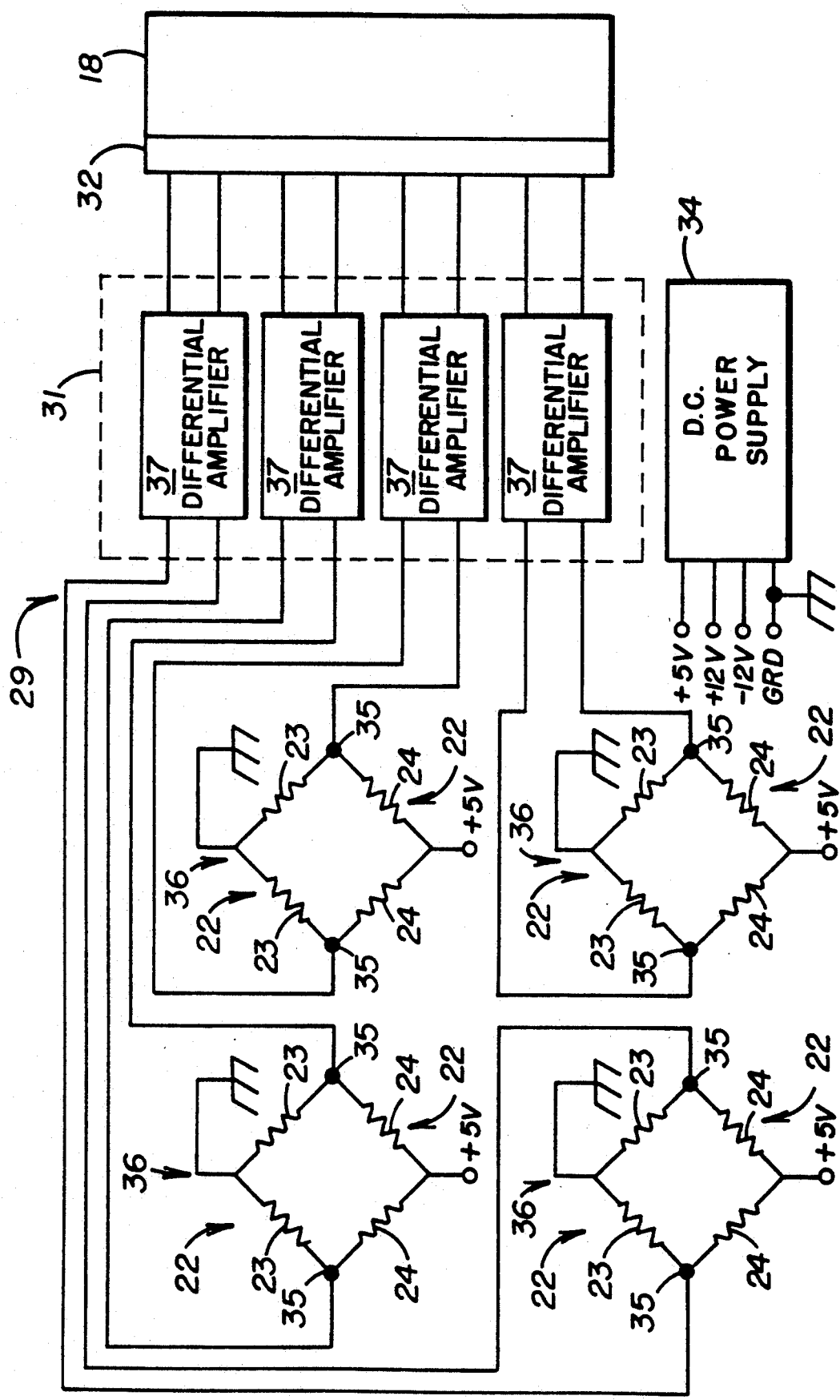
FIG. 5 is a schematic circuit diagram depicting circuit components of the touch panel and inter-connections therebetween.

Referring initially to FIG. 1 of the drawings, components of a touch panel 11 in accordance with this embodiment of the invention include a thin flat rectangular panel member 12 which is supported at each corner 13 by one of four small post-like panel member supports 14 which are secured to the underside of the panel by adhesive or other means. Panel member 12 may also have a non-rectangular configuration where that is appropriate to the equipment with which the panel 11 is used and may also be curved to conform with non-planar surfaces on which it may be mounted such as the slightly convex screens of many cathode ray tubes, for example.

As the panel member 12 need not have any specialized electrical properties, it may be formed of any of a variety of materials including hard and durable materials that are insensitive to heat, humidity and other environmental factors. Glass is a highly suitable material, particularly where it is desired that the panel member 12 be transparent, although other materials can also be used. The panel member 12 of this embodiment should be sufficiently thin to exhibit some slight elasticity although this is not necessary in certain other embodiments, an example of which will be hereinafter described.

Supports 14 hold the panel member 12 in an at least slightly spaced apart relationship with the underlying surface 16 to enable a slight flexing of the panel member in response to the pressure of a human finger 17 or the force exerted by a stylus or other similar instrument. The supports 14 can be formed of any suitable rigid material but are preferably formed of rubber or other elastomeric substance. This acts to isolate the panel member 12 from vibrations and variation of the underlying surface 16 that could affect the precision of the touch locating function.

The touch panel 11 of this particular embodiment is designed to serve as a keypad or keyboard for entering data into a digital computer 18. In this context, the underlying surface 16 may simply be a desk top or table top on which the supports 14 rest. The surface 16 should be flat and smooth to assure that pressure on panel member 12 distributes the resulting force between the supports 14 in a manner that is precisely indicative of the location at which the pressure is applied. In usages where the panel member 12 may be disposed on un-even surfaces, the undersurface 16 may be defined by a flat rigid underplate 19 secured to supports 14 in spaced apart, parallel relationship with the panel member.

The touch panel 11 is provided with force sensing means 21 for sensing the magnitudes of the forces that are applied to each of the supports 14 by panel member 12 when the panel member is touched at a selected location on the member. In this embodiment, the force sensing means 21 includes a pair of small flat strain gauges 22 secured to each corner region 13 of panel member 12 at locations spaced slightly inward from the support 14 at that corner of the panel member, one of the pair of strain gauges being on the top surface of the panel member and the other being on the underside as may be seen in FIG. 2 in particular. In some instances only a single strain gauge 22 may be used at each corner of the panel member 12 but the use of a pair at each corner increases the sensitivity of the touch panel 11 to pressure and also enhances resolution.

Referring to FIG. 3, strain gauges 22 may be of the known half bridge type having an active resistor 23 and an orthogonally oriented compensation resistor 24 which are secured to a flat substrate 26 and in which the resistors are sensitive to bending or flexing of the substrate in a predetermined direction and exhibit resistances that vary in response to such flexing, the extent of the changes of resistance being dependent on the degree of flexing or bending of the substrate. The strain gauges 22 are oriented to cause the active resistors 23 to respond to the slight flexing or bending of the corner regions 13 of panel member 12 that results from finger pressure against the panel member. In this example, the strain gauges 22 are oriented at a 45 degree angle with respect to the adjacent sides of panel member 12. The strain gauges 22 may, for example, be type N2A-06-T035R-BAL manufactured by Micromeasurements Group, Inc., Raleigh, N.C., U.S.A., although other types of strain gauge may also be used.

Referring to FIG. 4, the forces which panel member 12 applies to each support 14 when a finger 17 presses against the member are unequal except when the area of finger concontact is at the center 27 of the member which may be viewed at the origin point 0 of an X and Y axis coordinate system, the X axis being horizontal as viewed in FIG. 4 and the Y axis being vertical. Finger pressure at off-center locations causes greater forces to be applied to the supports 14 that are closest to the contacted location and proportionately smaller forces to be applied to the supports that are further from that location. Pressures exerted on panel member 12 at different locations cause a variation of the distribution of the force between the four supports 12 that is unique for each different location on the member. The degree of flexing of each corner region 13 of the panel member that is sensed by the strain gauges 22 varies in a similar manner. Thus the location at which pressure is being applied to panel member 12 can be calculated by comparing the momentary values of the variable resistances of the four sets of strain gauges which resistances are in effect measurements of the force which is being applied to the adjacent one of the supports 14.

In particular, if the lengths of the touch sensitive area of the panel member 12 along both the X and Y axes are considered to have a value of one, then the X and Y coordinates of the touched location 28 are:

$$X = \frac{1}{2} - \frac{Z_1 + Z_4}{Z_5} \qquad Y = \frac{1}{2} - \frac{Z_4 + Z_3}{Z_5}$$

where:

X is the position of location 28 along the X axis,
Y is the position of location 28 along the Y axis,
$Z_1$ through $Z_4$ are the forces applied to the supports identified by those symbols in FIG. 4, and
$Z_5$ which equals $Z_1 + Z_2 + Z_3 + Z_4$ is the total force applied at location 28.

Translation of the strain gauge 22 readings into signals that identify location 28 can be accomplished by digital data processing or by analog electrical circuits as will hereinafter be described in more detail. In the present embodiment, with reference again to FIG. 1, the panel member 12 is coupled to digital computer 18 through a ten conductor insulated ribbon 29, a four channel differential amplifier 31 and an analog to digital signal converter 32 which is an internal component of the computer in this example although a separate A/D converter may used if the particular computer lacks that capability. Computer 18 is in turn coupled to a visual data display device 33 in the known manner, the display device being of the cathode ray tube type in this example although it may also be a liquid crystal display or other means for displaying data.

Referring to FIG. 5, a D.C. power supply 34 transmits chassis ground potential and an operating voltage of +5 volts in this example to the strain gauges 22 through the ribbon conductor 29. The pair of half bridge strain gauges 22 at each corner of the panel member are electrically interconnected in parallel relationship to form a full bridge 36 across which the operating voltage is applied. Voltages at the two junction points 35 between the resistors 23 and 24 of each such bridge 36 are transmitted back to the differential amplifier circuit 31 and in particular to the two inputs of an individual one of four differential amplifiers 37 within that circuit.

Referring to FIG. 6, each such differential amplifier 37 may include two integrated circuit chips 38 and 39 of the OP 27EP type, manufactured by Motorola, Inc. The voltages from the bridge are transmitted to pins 2 and 3 of IC 38 through resistors 41. Pin 2 is also connected to pin 6 through a resistor 42 and pin 3 is also connected to ground through another resistor 43. Positive and negative D.C. voltages from the previously described power supply are applied to pins 7 and 4 of IC 38 and also to the corresponding pins of IC 39.

The signal output conductor 44 of the differential amplifier 37 connects to pin 6 of IC 39 and also to pin 6 of IC 38 through the resistive element of a potentiometer 46 and a fixed resistance 47. An adjustable voltage from potentiometer 46 is transmitted to pin 2 of IC 39. The output conductor 44 of each such differential amplifier 37 is accompanied by a ground potential conductor 48.

Potentiometer 46 enables adjustment of the gain of differential amplifier 37 for the purpose of matching the signal level requirements of the circuit component that receives the output signals. The potentiometer 46 may be replaced with a fixed resistance in instances where that circuit component is always of the same type. Pins 1 and 8 of IC 39 are not used. Pins 1 and 8 of IC 38 are not necessarily used in all instances but in this embodiment are bridged by the resistive element of another potentiometer 49 which has an adjustable tap connected to the positive D.C. voltage terminal. This enables an offset adjustment of signal input level to compensate for manufacturing variations in the responses of the strain gauges 22.

The circuits 37 of the above described specific form may be replaced with other differential amplifiers of known types.

Referring again to FIG. 5, the output voltage from each differential amplifier 37 is proportional to the difference between the voltages at the two junction points 35 of the associated bridge 36 and thus has a magnitude indicative of the force which is being applied to the particular support 14 that is adjacent to that bridge. The amplifier output signals are converted to digital form by converter 32 for processing by computer 18.

Referring again to FIG. 1, computer 18 is programmed to act as a location analyzing means for sensing the location on panel member 12 that is being touched and for generating digital signals that identify that location. This is accomplished by performing the hereinbefore described mathematical calculations that produce the X and Y axis coordinates of the touched location. The computer 18 of this example is an IBM AT type and a program listing, termed POSITION.BAS, for enabling the computer to perform the above described calculations is set forth at the end of this specification. When operating with this program listing, the computer 18 displays the calculated X and Y coordinates 51 and the sum of the sensed forces on the screen 52 of visual data display 33. Display of this data is not necessary in many usages of the touch panel 11. As is understood in the art, the computer may utilize the different signals entered through a touch panel, key pad, keyboard or the like in any of a wide variety of ways depending on the operations which are to be performed by the computer. The computer may for example be programmed to interpret signals originating from different areas of the touch panel 12 as menu selections, i.e. instructions to perform selected ones of a plurality of different operations. In other instances, as in word processing, the computer 18 may interpret the different signals as selected alphanumeric characters.

When the appended computer program is used, the operator can recognize that data has in fact been entered as the calculated coordinates 51 appear at screen 52. In instances where the coordinates are not displayed, some other form of feedback to the operator is desirable since the touch panel 12 is silent and has no snap action tactile feedback as in mechanical keyboards. This can be accomplished by having some symbol appear at screen 52 or by causing each data entry to initiate a momentary sound from a beeper or the like.

A single touch of the panel member 12 may, if desired, be used to enter more data than just the location of the touch since the sum of the forces detected by the strain gauges 22 is an indication of the amount of force that is being exerted on panel member 12 by finger 17 or the like. Thus different degrees of finger pressure at the same panel location can represent different instructions to the computer 18 or differing data of other kinds. Movement of the finger 17 along the panel member 12 in any direction results in a sequence of coordinate signals that is indicative of the movement and the speed of the movement. These motions may, for example, be used to control panning and scrolling of the display at screen 52 or for other purposes. If additional strain gauges are provided, it is also possible to detect lateral pressures and torsional or twisting forces exerted against the panel member 12 by a finger and thereby input still other data.

Panel member 12 may, where appropriate, be provided with markings 53 delineating and identifying distinct areas of the member that produce different specific data entries.

The panel member 12 of the above described embodiment is a separate unit connected to computer 18 and display device 33 through a flexible ribbon conductor 29. Referring to FIG. 7, the panel member 12 can be disposed in front of the screen 52 of the visual data display device 33 so that the operator views the screen through the transparent panel member. The panel member supports 14 hold the panel member 12 in a slightly spaced apart relationship with the screen 52 and are secured to the screen or to the framing 54 which encircles the screen. The signals produced by touching different areas of panel member 12 can be correlated with data that is visually displayed on screen 52. For example, in instances where the screen 52 displays a menu 56 listing alternative operations, the touch panel may be used to enter the signal that initiates a selected operation in response to touching of the area of panel member 12 that overlays the particular menu listing.

Figure 8:
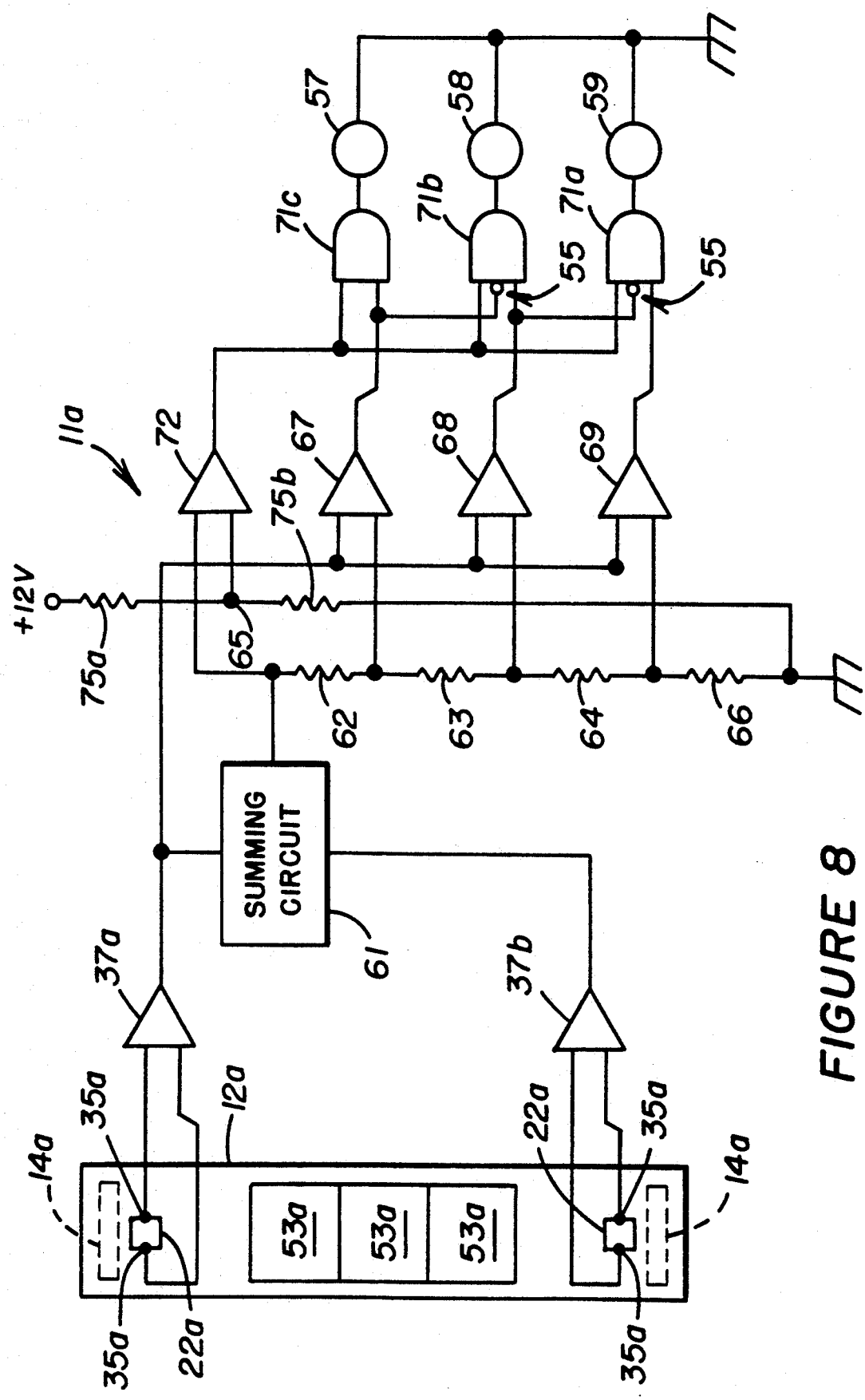
FIG. 8 is a circuit diagram of another embodiment of the invention that utilizes analog circuit elements, rather than digital data processing, for the purpose of determining the location at which pressure is exerted on a touch panel.

The invention is not limited to systems which include a digital computer 18 or other digital data processor as analog circuit elements can be used to determine the location on a panel that is touched from the signals that originate at the force sensing means 21. It is also possible to utilize differing numbers of strain gauges 22 or the like to derive the information needed to identify the touched location. FIG. 8 illustrates another touch panel 11a which embodies these variations.

Referring to FIG. 8, the touch panel 11a of this embodiment has a narrower panel member 12a with markings 53a designating a single column of three areas along the length the member which can be touched to energize a selected one of three devices 57, 58 and 59 which can be any kind of electrically actuated device such as lamps, electrical motors or solenoid operated valves among many other examples. Thus touch panel 11a is the equivalent of a three button switch panel.

As it is not necessary in this case to sense location in two orthogonal directions, the panel member 12a may have a single support 14a and a single strain gauge 22a at each end. Voltages from the two signal terminals 35a of each strain gauge 22a are applied to the two inputs of a separate one of two differential amplifiers 37a and 37b.

The output voltages from the two differential amplifiers 37a and 37b are transmitted to a summing circuit 61 which produces an output voltage that is indicative of the total force that is applied to panel member 12a by a human finger or the like, the output of the summing circuit being connected to ground through four voltage dropping resistances 62, 63, 64 and 66.

The output voltage from one of the differential amplifiers 37a is also applied to a first input of each of three comparator amplifiers 67, 68 and 69 of the known type which have an output voltage that switches from a low state to a high state when the voltage at the first input equals or exceeds a reference voltage applied to the second input of the comparator. The second input of comparator 67 is connected to the junction between resistances 62 and 63, the second input of comparator 68 connects to the junction between resistors 63 and 64 and the second input of comparator 69 is connected to the junction between resistances 64 and 66. Thus the comparators 67, 68 and 69 receive progressively lower reference voltages when a voltage appears at the output of summing circuit 61.

The output voltages from differential amplifiers 37a and 37b are indicative of the location along panel member 12a that is touched in the manner previously described. The amplifier 37a and 37b output voltages are equal or differ by a relatively small amount if the center area 53a is touched. The output voltage from differential amplifier 37a is low in relation to the output voltage of summing circuit 61 when the lowermost of areas 53a is touched and becomes progressively higher in relation to the the summing circuit output when the center and uppermost of the areas 53a are touched.

The values of resistors 62, 63, 64 and 66 are selected to cause comparator 69 to be triggered when the lowermost area 53a is touched, to cause comparator 68 to be also triggered when the center area 53a is touched and to cause triggering of all three comparators when the upper area 53a is touched.

The output of comparator 69 is applied to one input of a first AND gate 71a, the output of comparator 68 is applied to one input of a second AND gate 71b and the output of comparator 67 is connected to one input of a third AND gate 71c. The outputs of AND gates 71a, 71b and 71c are connected to ground through devices 59, 58 and 57 respectively and thus enabling of any of the AND gates actuates the device to which it is connected.

An additional comparator 72 also receives the output voltage from summing circuit 61. A small fixed positive voltage is applied to the reference input of comparator 72 from a circuit junction 65 between two voltage dropping resistances 75a and 75b which are connected in series between the D.C. power supply and ground. Thus comparator 72 is triggered only when a predetermined minimum degree of pressure is being exerted against panel member 12a. The output of the additional comparator 72 is connected to the second input of each of the AND gates 71a, 71b and 71c. Thus all AND gates are disabled and all devices 57, 58 and 59 remain unactuated at times when no force is being exerted against panel member 12a and at times when the degree of force is below a threshold magnitude determined by the relative values of resistances 75a and 75b.

AND gate 71c is of the two input type and thus is enabled at any time that the output voltages from comparators 67 and 72 are high. AND gates 71a and 71b are of the type which have a third input 55 at which incoming signals are inverted. The inverting input 55 of AND gate 71a is connected to the output of comparator 68 and the inverting input of AND gate 71b is connected to the output of comparator 67.

In operation, touching of the lower area 53a of panel member 12a with a degree of force at or above the threshold causes the output of comparator 69 to go high thereby enabling AND gate 71a which actuates device 59. The voltage from differential amplifier 37a is too low to trigger comparators 67 and 68 and devices 57 and 58 remain unenergized. If the center area 53a is touched, both of comparators 68 and 69 are triggered but only AND gate 71b is enabled and only device 58 is energized. The output of comparator 68 is inverted at input 55 of AND gate 71a thereby disabling that gate. Touching of the uppermost area 53a with at least the minimum force triggers each of comparators 67, 68 and 69 but also results in disabling of AND gates 71a and 71b so that only AND gate 71c is enabled and only device 57 is actuated.

As will be apparent, the analog location analyzing means 18a described above can be extended to distinguish between any desired number of areas 53a and to distinguish between areas in two different orthogonal directions if desired.

The forces that are applied to the panel member supports when a panel member is touched can be sensed by a variety of force sensing means besides strain gauges. The slight displacement of the panel in the region of the supports can be sensed by optical or acoustical devices or by devices which detect changes of capacitance or inductance brought about by such displacement, among other types of device. For example, with reference to FIGS. 9 and 10, another embodiment 11c of the invention makes use of pressure sensitive resistors 73c to 73j of the known form which exhibit a decreasing resistance when subjected to an increasing force applied normal to the surface of the resistor. Such resistors 73c to 73j are polymer thick films and are available in flat ribbon like form.

The touch panel 11c of this embodiment has a flat, rectangular panel member 12c that does not necessarily need to be flexible. Pressure sensitive resistors 73c and 73d extend along the edge regions of the front surface of panel member 12c adjacent the long edges of the member and shorter pressure sensitive resistors 73e and 73f extend along the edge regions of the front surface adjacent the ends of the member. Resistors 73g, 73h, 73i and 73j extend along the back surface of panel member 12c at locations respectively corresponding to the locations of resistors 73c, 73d, 73e and 73f on the front surface. Each of the resistors 73c to 73j lies flat against panel member 12c and is secured to the panel member by adhesive or the like.

Flat strips 80 of elastomeric material such as rubber are formed into a channel shaped configuration and one of the strips is fitted onto each edge of panel member 12c to cover the pair of the resistors 73 that extend along the particular edge. The strips 80 act as force spreaders which prevent forces from being concentrated at a single point on a resistor 73.

The panel member supports 14c in this embodiment are four channel shaped elements each of which is fitted onto a separate edge region of panel member 12c, over the ones of resistors 73c to 73j and the one of the strips 80 that extend along that edge region. Each such support 14c is crimped onto the panel edge to exert a laterally compressive force against the strip 80 that extends along the panel edge and to thereby apply a compressive force to the pair of resistors 73 that extend along the panel edge.

Figure 10:
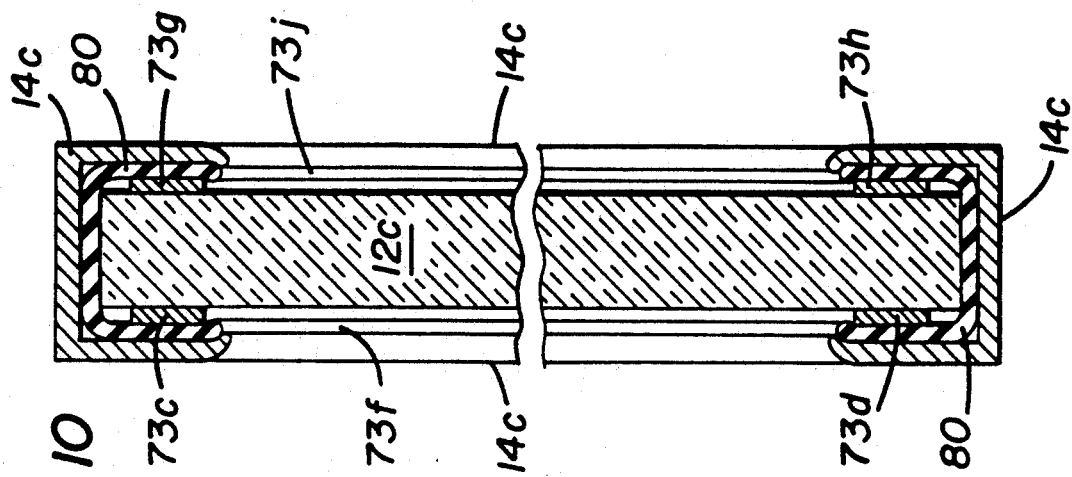
FIG. 10 is a cross section view of the touch panel of FIG. 9 taken along line 10—10 thereof.
Figure 9:
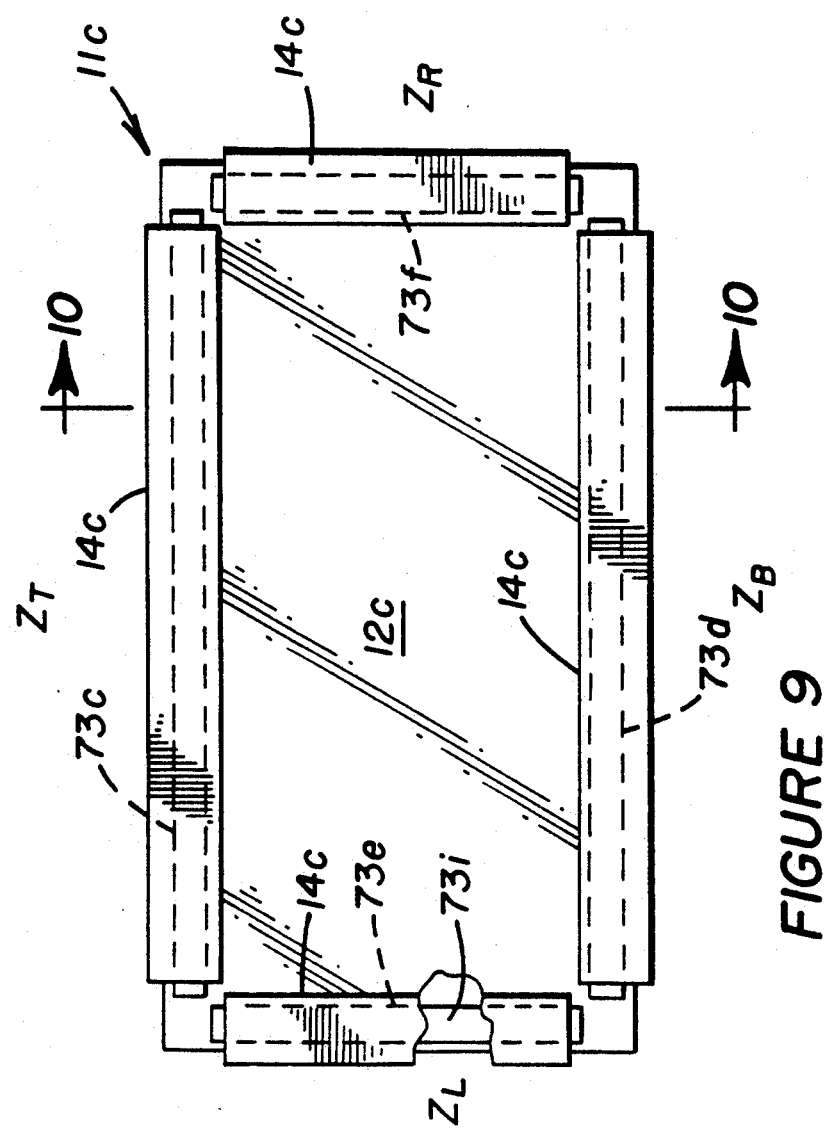
FIG. 9 is a plan view of still another embodiment of the invention which uses force sensitive resistors to sense the forces applied to touch panel supports.

The other components of the touch panel 11c may be similar to those of the previously described embodiment of FIGS. 1 to 6. Referring jointly to FIGS. 5, 9 and 10, the necessary electrical connections are made by replacing the two strain gauge resistors 23 and 24 which appear at the right side of each bridge 36 in FIG. 5 with a separate pair of the pressure sensitive resistors 73c to 73j of the present embodiment, each such pair of resistors being the two resistors that extend along the same edge region of panel member 12c. The pair of resistors 23 and 24 which appear at the left side of each bridge 36 of FIG. 5 are, in this embodiment, bridge balancing resistors having fixed resistances corresponding to the resistances exhibited by the associated pair of resistors 73c to 73j at the right side of the bridge 36 when no force is being exerted against panel member 12c.

When touch panel 11c rests on a surface or is disposed against a wall, forces exerted against the front of panel member 12c by a finger or the like are transmitted to the panel supports 14c through the the pressure sensitive resistors 73g, 73h, 73i and 73j that are at the back of panel member 12c and through the portions of the elastomeric strips 80 that are at the back of the panel. This increases the compressive forces acting on those resistors and reduces the compressive forces acting on the ones of the resistors 73c to 73f that are at the front of the panel member. The magnitudes of these force changes are sensed at bridges 36 and are processed by the location analyzing means 18 in the manner previously described to generate signals that are indicative of the location on panel member 12c that is being touched and which are indicative of the magnitude of the force that is being applied to the panel member.

Using the same X-Y coordinate system that was previously described in connection with the first embodiment of invention and which is depicted in FIG. 4, the X and Y coordinates of a touched location on the panel member 12c of the embodiment of FIGS. 9 and 10 are:

$$X = \frac{1}{2} - \frac{Z_L}{Z_L + Z_R} \qquad Y = \frac{1}{2} - \frac{Z_B}{Z_B + Z_T}$$

where:

X is the position of the touched location along the X axis'

Y is the position of the touched location along the Y axis, $Z_B$, $Z_T$, $Z_R$, $Z_L$ are respectively the detected forces that are being exerted on the supports 14c at the bottom, top, right side and left side of panel member 12c as viewed in FIG. 9.

While the invention has been described with reference to certain specific embodiments many modifications of the apparatus are possible and it is not intended to limit the invention except as defined in the following claims.

PROGRAM LISTING (POSITION.BAS)

```
10   SET = 0
20   KEY OFF
30   CLS
40   INPUT "Enter ADC CHANNEL";ADC
50   IF ADC < 769 OR ADC > 797 THEN PRINT "769 < = ADC < = 797": GOTO 40
60   STATUS = ADC - 1
70   CLS
80   LOCATE 24,30: PRINT"Press Esc to exit"
90   LOCATE 5,1
100  FOR CHANNEL = 0 TO 3
110  OUT ADC, CHANNEL * 16: REM select channel
120  X = INP(ADC): REM start a conversion
130  COUNT = INP(ADC + 1) * 256 + INP(ADC): REM read the answer
140  VOLTS = (COUNT−32768!) * 1.52588E-04: REM scale in volts
150  Z(CHANNEL) = COUNT
160  NEXT CHANNEL
170  IF INKEY$ = CHR$(27) THEN END
180  IF SET < 3 THEN GOSUB 340
190  PRINT ZBASE0 − Z(0), ZBASE1 − Z(1), ZBASE2 − Z(2), ZBASE3 − Z(3)
200  Z(0) = ZBASE0 − Z(0)
210  Z(1) = ZBASE1 − Z(1)
220  Z(2) = ZBASE2 − Z(2)
230  Z(3) = ZBASE3 − Z(3)
240  ZSUM = Z(0) + Z(1) + Z(2) + Z(3)
250  IF ZSUM > −80 THEN GOTO 90
260  XVALUE1 = INT (1000 * (.5 − ((Z(0) + Z(1)) / (ZSUM))))
270  XVALUE2 = INT (1000 * (.5 + ((Z(2) + Z(3)) / (ZSUM))))
280  PRINT "X "; (XVALUE1 + XVALUE2) / 2; " ",
290  YVALUE1 = INT (1000 * (.5 − ((Z(0) + Z(3)) / (ZSUM))))
300  YVALUE2 = INT (1000 * (.5 + ((Z(1) + Z(2)) / (ZSUM))))
310  PRINT "Y "; (YVALUE1 + YVALUE2) / 2; " ",
320  PRINT "Z "; INT (ZSUM * .007629);"
330  GOTO 90
340  ZBASE0 = Z(0)
350  ZBASE1 = Z(1)
360  ZBASE2 = Z(2)
370  ZBASE3 = Z(3)
380  SET = SET + 1
390  RETURN
```

I claim:

1. In a touch sensitive panel for generating selected ones of any of a plurality of different signals each of which is generated by touching a different location on the panel, the combination comprising:

a rectangular panel formed of material which exhibits a degree of elasticity, a plurality of panel member supports which support said panel member at spaced apart regions thereof, the panel member supports being separate from the panel member, force sensing means positioned upon said panel member for sensing the magnitudes of the forces that are applied to each of said spaced apart supports by said panel member when said panel member is touched at a selected location thereon, wherein said forces are sensed by detecting the deformation of said panel member in the vicinities of each of said supports that is caused by touching of said panel member, and location analyzing means for determining the location on said panel member that is being touched by comparing the magnitudes of said forces that are applied to said spaced apart supports by said panel member and for generating the one of said signals that corresponds to the determined location.

2. The apparatus of claim 1 wherein said panel member has a touch sensitive area with said first and second opposite ends and wherein at least one of said panel member supports is situated at each of said ends and wherein said location analyzing means compares the force which said panel member exerts at said first end of said touch sensitive area with the sum of the forces exerted by said panel member at both ends of said area in order to sense the position of said touched location along said panel.

3. The apparatus of claim 1 wherein said panel member has a touch sensitive area bounded by first and second ends and first and second sides and wherein at least one of said panel member supports is situated at each of said ends and at each of said sides, and wherein said location analyzing means senses the position of said touched location along a first axis by comparing the force exerted by said panel member at said first end of said area with the total force exerted by said panel member and senses the position of said touched location along a second orthogonal axis by comparing the force exerted by said panel member at said first side of said area with the total force exerted by said panel member.

4. The apparatus of claim 1 wherein said location analyzing means produces signals which have a first signal component indicative of the location at which said panel member is touched and a second signal component indicative of the magnitude of the pressure which is exerted against said panel member at said location.

5. The apparatus of claim 1 wherein said force sensing means includes a plurality of electrical circuit components of the type which exhibit a change of electrical properties in response to forces exerted thereon.

6. The apparatus of claim 5 wherein said circuit components exhibit a change of electrical resistance in response to forces exerted thereon, further including a plurality of electrical resistors and a plurality of circuit junctions, each of said resistors being connected to a separate one of said circuit components at a separate one of said circuit junctions, a direct current power supply connected to each of said circuit components and resistors to transmit current through each of said components and the one of said resistors that is connected thereto, and wherein said location analyzing means generates said signals in response to voltage changes at said circuit junctions.

7. The apparatus of claim 5 wherein said circuit components are strain gauges secured to said panel member in the vicinity of said supports.

8. The apparatus of claim 7 wherein a pair of said strain gauges are secured to said panel member in the vicinity of each of said panel member supports, the strain gauges of each pair being secured to opposite surfaces of said panel member, each of said strain gauges having an output terminal which exhibits a voltage that varies in response to flexing of the strain gauge, further including a plurality of differential amplifiers each having inputs connected to said output terminals of a separate pair of said strain gauges and each having an output coupled to said location analyzing means to transmit a signal thereto that is indicative of the voltage difference at the output terminals of the pair of strain gauges to which the amplifier is connected.

9. The apparatus of claim 5 wherein said location analyzing means includes a digital computer, further including analog to digital signal conversion means for converting the electrical voltages at said circuit junctions into digital signals which represent said voltages.

10. The apparatus of claim 1 wherein said panel member is transparent.

11. The apparatus of claim 10 further including a visual data display device having a display screen and wherein said transparent panel member is disposed in front of said display screen in spaced apart relationship therewith.

12. The apparatus of claim 11 wherein said panel member supports extend from said panel member to said visual data display device and secure said panel member thereto.

13. The apparatus of claim 1 wherein said panel member supports are formed of resilient material.

14. A touch panel for generating selected ones of a plurality of different signals wherein each of said signals is correlated with a different location on said touch panel, comprising:
a rectangular panel member having a touch sensitive area bounded by first and second sides and first and second ends,
a plurality of panel member supports which support said panel member at spaced apart regions which are situated at said sides and ends of said touch sensitive area, the panel member supports being separate from the panel member,
a plurality of strain gauges of the type in which electrical resistances varies in response to strain, each of said strain gauges being secured to said panel member at a location thereon which is near an associated one of said panel member supports to sense the force which said panel member exerts on said associated one of said panel supports by detecting deformation of said panel member in the vicinity of said associated one of said supports,
means for producing a plurality of electrical voltages each of which varies in response to changes of said resistance of a separate one of said strain gauges and thereby indicates the force sensed by that strain gauge, and
data processing means for determining the location on said panel member where pressure is exerted thereagainst by comparing said forces which are sensed by said strain gauges and for producing the one of said signals that correlates with said location.

15. The apparatus of claim 14 wherein one of said panel member supports is situated at each corner of said touch sensitive area and wherein said strain gauges are secured to the corner regions of said panel member at locations adjacent to said support members.

16. The apparatus of claim 14 wherein said data processing means includes a digital computer, further including a visual data display device coupled to said computer and having a screen on which data generated by said computer may be displayed, and wherein said panel member is transparent and is positioned in front of said screen in spaced apart relationship therewith and wherein said panel member supports extend between said panel member and said data display device.

17. In a touch sensitive panel for generating selected ones of any of a plurality of different signals each of which is generated by touching a different location on the panel, the combination comprising:
a rectangular panel member
support means for holding said panel in spaced apart relationship with an underlying surface,
a plurality of pressure sensitive resistors disposed between said panel member and said support means in position to be compressed against said support means when force is exerted against said panel member, said resistors being strips of resistive material of a type which exhibit a change of electrical resistance when pressure is exerted against the resistor, said resistors being disposed to extend along spaced apart regions of the periphery of said panel member, force sensing means for sensing the magnitudes of the forces that are applied to said support means through each of said resistors when said panel member is touched at a selected location thereon by detecting changes of the electrical resistance of each of said resistors that result from said touching of said panel member, and location analyzing mans for sensing the location on said panel member that is being touched by comparing the magnitudes of said forces and for generating the one of said signals that corresponds to the sensed location.

18. The apparatus of claim 17 further including a plurality of strips of elastomeric material each being disposed between a separate one of said pressure sensitive resistors and said support means.

19. The apparatus of claim 17 wherein said pressure sensitive resistors extend along edge regions of said panel member and wherein said support means includes linear support members fitted onto said edge regions of said panel members, said support members having grooves extending therealong in which said edge regions of said panel members and said pressure sensitive resistors are disposed.

20. The apparatus of claim 17 wherein pairs of said pressure sensitive resistors extend along edge regions of said panel member, the resistors of each pair being disposed on opposite faces of said panel member edge regions and wherein said support means includes support members extending along said edge regions of said panel members and having grooves in which said edge regions of said panel members including said pairs of resistors are received, further including a plurality of strips of elastomeric material disposed in said grooves of said support members, said strips of elastomeric material being situated between said pressure sensitive resistors and said support means and wherein said grooves of said support members are proportioned to compress said strips of elastomeric material against said pressure sensitive resistors whereby touching a surface of said panel member increases the compression of one of each pair of pressure sensitive resistors and reduces compression of the others of each pair of pressure sensitive resistors.

21. The apparatus of claim 17 wherein said panel member is substantially rectangular and wherein at least one of said pressure sensitive resistors extends along each edge region of said panel member and wherein said support means includes four channel shaped support members each being fitted onto a separate one of said edge regions of said panel member.

22. The apparatus of claim 21 further including strips of elastomeric material disposed within said channel shaped support members between the pressure sensitive resistors and the inner walls of said support members.

23. In a touch sensitive panel for generating selected ones of any of a plurality of different signals each of which is generated by touching a different location on the panel, the combination comprising:

a rectangular panel member formed of material which exhibits a degree of elasticity, a plurality of panel member supports which support said panel member at spaced apart regions thereof, the panel member supports being separate from the panel member, force sensing means positioned on said panel member for sensing the magnitudes of the forces that are applied to each of said spaced apart supports by said panel member when said panel member is touched at a selected location thereon, wherein said forces are sensed by detecting the deformation of said panel member in the vicinities of each of said supports that is caused by touching of said panel member, and location analyzing means for sensing the location on said panel member that is being touched by comparing the magnitudes of said forces that are applied to said spaced apart supports by said panel member and for generating the one of said signals that corresponds to the sensed location wherein said force sensing means includes a plurality of strain gauges of the type which exhibit a change of electrical properties in response to forces exerted thereon, and further wherein a pair of said strain gauges are secured to said panel member in the vicinity of each of said panel member supports, the strain gauges of each pair being secured to opposite surfaces of said panel member, each of said strain gauges having an output terminal which exhibits a voltage that varies in response to flexing of the strain gauge, further including a plurality of differential amplifiers each having inputs connected to said output terminals of a separate pair of said strain gauges and each having an output coupled to said location analyzing means to transmit a signal thereto that is indicative of the voltage difference at the output terminals of the pair of strain gauges to which the amplifier is connected.

* * * * *